(12) United States Patent
Tang

(10) Patent No.: US 11,825,519 B2
(45) Date of Patent: Nov. 21, 2023

(54) RANDOM ACCESS METHOD, TERMINAL DEVICE, NETWORK DEVICE, AND STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 338 days.

(21) Appl. No.: 17/149,304

(22) Filed: Jan. 14, 2021

(65) Prior Publication Data

US 2021/0144770 A1    May 13, 2021

Related U.S. Application Data

(63) Continuation of application No. PCT/CN2019/082322, filed on Apr. 11, 2019.

(30) Foreign Application Priority Data

Jul. 27, 2018  (CN) .......................... 201810844989.2

(51) Int. Cl.
  *H04W 74/08*  (2009.01)
  *H04W 72/04*  (2023.01)
  (Continued)

(52) U.S. Cl.
  CPC ... *H04W 74/0833* (2013.01); *H04W 72/0446* (2013.01); *H04W 72/0453* (2013.01); *H04W 74/004* (2013.01)

(58) Field of Classification Search
  CPC ......... H04W 72/0446; H04W 74/0833; H04W 74/004; H04W 72/0453; H04W 74/008
  See application file for complete search history.

(56) References Cited

U.S. PATENT DOCUMENTS

2009/0225701 A1* 9/2009 Kwon .................. H04L 1/0006
                                                          370/328
2012/0155274 A1    6/2012 Wang et al.
(Continued)

FOREIGN PATENT DOCUMENTS

CN   101155404 A    4/2008
CN   101500267 A    8/2009
(Continued)

OTHER PUBLICATIONS

International Search Report with English Translation for PCT/CN2019/082322 dated Jun. 27, 2019.
(Continued)

*Primary Examiner* — Brian D Nguyen
(74) *Attorney, Agent, or Firm* — Young Basile Hanlon & MacFarlane, P.C.

(57) ABSTRACT

Random access method, terminal device, network device, and storage medium Disclosed is a random access method, comprising: a terminal device determines a first physical random access channel (PRACH) resource set and a second PRACH resource set, the first PRACH resource set being used for the PRACH sending during a first-type random access process, the second PRACH resource set being used for the PRACH sending during a second-type random access process, at least one of first PRACH resources comprised in the first PRACH resource set being different from second PRACH resources comprised in the second PRACH resource set; the terminal device determines a target PRACH resource from the first PRACH resource set or the second PRACH resource set, the target PRACH resource being used for the PRACH sending during a random access process.

20 Claims, 4 Drawing Sheets

---

A network device determines a first PRACH resource set and a second PRACH resource set — S401

The network device determines to perform a first type of random access procedure or a second type of random access procedure based on a received PRACH resource set to which a target PRACH resource belongs — S402

(51) Int. Cl.
*H04W 74/00* (2009.01)
*H04W 72/0446* (2023.01)
*H04W 72/0453* (2023.01)

(56) References Cited

U.S. PATENT DOCUMENTS

| | | | |
|---|---|---|---|
| 2017/0273108 A1 | 9/2017 | Damnjanovic et al. | |
| 2017/0295596 A1 | 10/2017 | Chen et al. | |
| 2018/0279375 A1* | 9/2018 | Jeon | H04W 72/23 |
| 2021/0075574 A1* | 3/2021 | Jung | H04L 5/0007 |
| 2021/0136827 A1* | 5/2021 | Xiong | H04L 5/0053 |
| 2021/0212111 A1* | 7/2021 | Cho | H04W 74/08 |
| 2021/0298078 A1* | 9/2021 | Harada | H04W 74/0808 |
| 2022/0278816 A1* | 9/2022 | Moon | H04W 72/1263 |

FOREIGN PATENT DOCUMENTS

| | | |
|---|---|---|
| CN | 102404865 A | 4/2012 |
| WO | 2013138701 A2 | 9/2013 |
| WO | 2015012666 A1 | 1/2015 |
| WO | 2018085726 A1 | 5/2018 |
| WO | WO 2018/085726 A1 * 5/2018 | ............ H04W 74/08 |
| WO | 2018127042 A1 | 7/2018 |
| WO | 2018175809 A1 | 9/2018 |
| WO | 2019086039 A1 | 5/2019 |

OTHER PUBLICATIONS

Extended European Search Report for EP Application 19841498.9 dated Sep. 8, 2021. (10 pages).
Indian Examination Report for IN Application 202127004878 dated Feb. 17, 2022. (5 pages).
3GPP TSG RAN WG1 Meeting AH; 1801; Vancouver, Canda; Jan. 22-26, 2018; R1-1800727.
Japan Office Action with English Translation for JP Application No. 2021-501346 dated Feb. 14, 2023.
Communication pursuant to Article 94(3) EPC for EP Application 19841498.9 dated Jul. 5, 2023. (6 pages).
Australian Examination Report No. 1 for AU Application 2019310936 dated Sep. 7, 2023. (4 pages).

* cited by examiner

RANDOM ACCESS METHOD, TERMINAL DEVICE, NETWORK DEVICE, AND STORAGE MEDIUM

CROSS-REFERENCE TO RELATED APPLICATION(S)

This application is a continuation application of International Application No. PCT/CN2019/082322, filed on Apr. 11, 2019, which claims priority to Chinese application No. 201810844989.2, filed on Jul. 27, 2018, the entire disclosures of both of which are hereby incorporated by reference.

TECHNICAL FIELD

Implementations of the application relate to the technical field of wireless communication, specifically to a random access method, a terminal device, a network device and a storage medium.

BACKGROUND

In a 5$^{th}$ Generation (5G) New Radio (NR) system, a Random Access (RACH) process is similar to an RACH process in a Long Term Evolution (LTE) system, and is not suitable for a low-delay scenario in an NR system. Therefore, it is an urgent problem to be solved to provide a random access method suitable for low delay in the NR system.

SUMMARY

Implementations of the present application provide a random access method, a terminal device, a network device and a storage medium, which can quickly realize random access for a scenario with low delay in an NR system.

In a first aspect, a random access method is provided, including: determining, by a terminal device, a first Physical Random Access Channel (PRACH) resource set and a second PRACH resource set, wherein the first PRACH resource set is used for PRACH sending in a first type of random access procedure, the second PRACH resource set is used for PRACH sending in a second type of random access procedure, and at least one of first PRACH resources included in the first PRACH resource set is different from at least one of second PRACH resources included in the second PRACH resource set; determining, by the terminal device, a target PRACH resource from the first PRACH resource set or the second PRACH resource set, wherein the target. PRACH resource is used for PRACH sending in a random access procedure.

In a second aspect, a random access method is provided, including: determining, by a network device, a first PRACH resource set and a second PRACH resource set, wherein the first PRACH resource set is used for PRACH sending in a first type of random access procedure, the second PRACH resource set is used for PRACH sending in a second type of random access procedure, and at least one of first PRACH resources included in the first PRACH resource set is different from at least one of second PRACH resources included in the second PRACH resource set; determining, by the network device, to perform the first type of random access procedure or the second type of random access procedure based on a PRACH resource set to which a received target PRACH resource belongs.

In a third aspect, a terminal device is provided, configured to perform the method in the above first aspect or various implementations thereof.

Specifically, the terminal device includes function modules for performing the method in the above first aspect or each implementation thereof.

In a fourth aspect, a network device is provided, including a processor and a memory. The memory is configured to store a computer program, and the processor is configured to call and run the computer program stored in the memory to execute the method in the above second aspect or various implementations thereof.

In a fifth aspect, a chip is provided, configured to implement the method in any one of the above first to second aspects or each implementation thereof.

Specifically, the chip includes a processor, configured to call and run a computer program from a memory, so that a device with which the chip is disposed performs the method in any one of the above first to second aspects or various implementations thereof.

In a sixth aspect, a computer readable storage medium is provided, configured to store a computer program, wherein the computer program causes a computer to perform the method in any one of the above first to second aspects or various implementations thereof.

In a seventh aspect, a computer program product is provided, including computer program instructions, wherein the computer program instructions cause a computer to perform the method in any one of the above first to second aspects or various implementations thereof.

In an eighth aspect, a computer program is provided, which, when being run on a computer, causes the computer to perform the method in any one of the above first to second aspects or various implementations thereof.

In the implementation of the invention, a terminal device determines a first PRACH resource set for PRACH sending in a first type of random access procedure and a second PRACH resource set for PRACH sending in a second type of random access procedure, and determines a target PRACH resource for PRACH sending in a random access procedure from the first PRACH resource set or the second PRACH resource set; it is enabled that a network device can determine, after receiving a PRACH, that the target PRACH resource sending the PRACH belongs to the first PRACH resource set or the second PRACH resource set; in this way, at determining that the target PRACH resource belongs to the first PRACH resource set or the second PRACH resource set, the network device can determine to perform, by itself, the first type of random access procedure corresponding to the first PRACH resource set or the second type of random access procedure corresponding to the second PRACH resource set; and aiming at a low-delay scenario in an NR system, random access can be quickly realized.

DETAILED DESCRIPTION

The technical solution in implementations of the present application will be described below with reference to the drawings in implementations of the present application. It is apparent that the implementations described are just some implementations of the present application, but not all implementations of the present application. According to the implementations of the present application, all other implementations achieved by a person of ordinary skill in the art without paying an inventive effort are within the protection scope of the present application.

Figure 1:
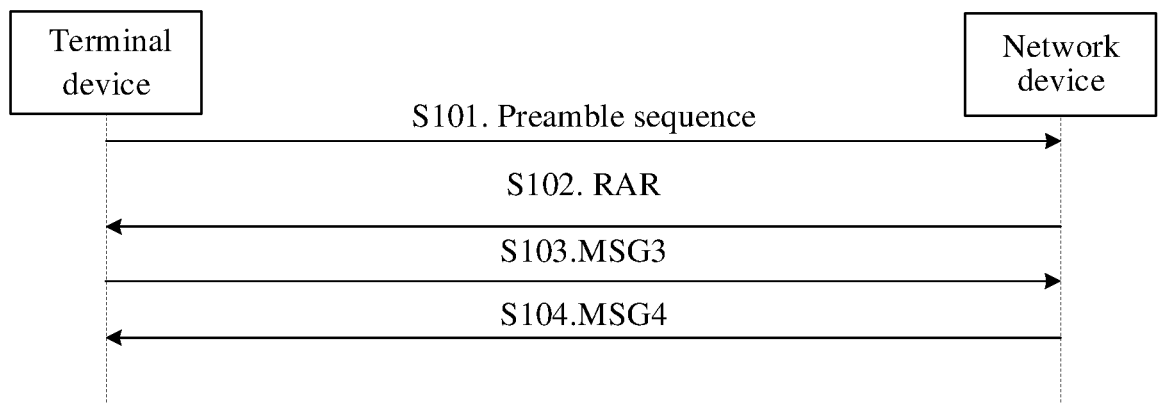
FIG. 1 is a processing flow diagram of a random access method of an NR system in the related art.

Before describing the implementations of the present disclosure in detail, firstly, a Random Access Channel (RACH) procedure in the related art is introduced. As shown in FIG. 1, the RACH procedure has four acts S101-S104.

In S101, a terminal device sends a random access Preamble to a network device through a message 1 (MSG1).

In S102, after the network device detects that there is a terminal device which sends a Preamble, the network device sends a Random Access Response (RAR) message to the terminal device through MSG2 to inform the terminal device of uplink resource information that may be used when sending MSG3, assigning a temporary Radio Network Temporary Identity (RNTI) to the terminal device, and provide the terminal device with a time advance command and the like.

In S103, after receiving the RAR message, the terminal device sends the MSG3 in an uplink resource specified by the RAR message, wherein the MSG3 carries a piece of temporary identity information specific to the terminal device.

In S104, the network device sends MSG4 to the terminal device, wherein the MSG4 includes a contention resolution message and allocates an uplink transmission resource for the terminal device.

Upon receiving the MSG4 sent by the network device, the terminal device will detect whether a terminal device-specific temporary identity sent by the terminal device at the MSG3 is contained in a contention resolution message sent by a base station. If yes, it is indicated that the random access procedure of the terminal device is successful; otherwise, it is considered that the random procedure has failed, and the terminal device needs to initiate the random access procedure starting from a first act again.

Figure 2:
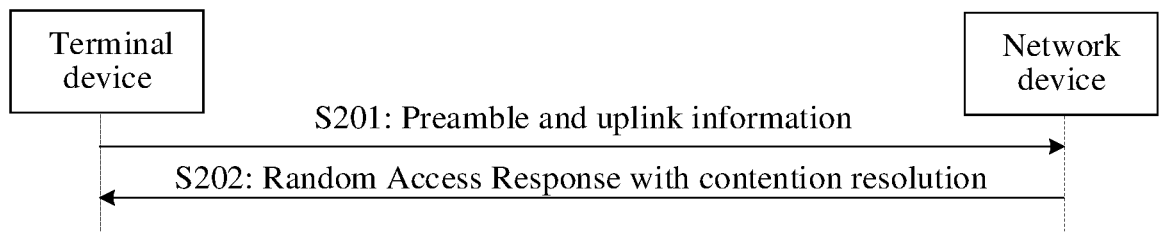
FIG. 2 is a processing flow diagram of an improved random access method according to an implementation of the present application.

In view of that the above RACH procedure needs to be completed through four times of information interaction between the network device and the terminal device, a delay of RACH the procedure is caused to be long; and in view of the problem of the long delay of the RACH process, an improved RACH method is proposed, as shown in FIG. 2, including following acts S201-S202.

In S201, the terminal device sends a preamble and uplink information to the network device.

Herein, the uplink information may be sent through a Physical Uplink Shared Channel (PUSCH) or another uplink channel or another uplink reference signal.

In S202, the network device sends a Random Access Response with contention resolution to the terminal device.

For a case that the above improved RACH method and the RACH method implemented by the network device and the terminal device through four times of information interaction in the NR system coexist, there is no effective solution at present for how to configure random access parameters so that the terminal device can determine resources needed to perform the above act S101 or the above act S201 after determining to perform the above act S101 or the above act S201.

In view of the above problem, an implementation of the present disclosure provides a random access method, and technical solutions of implementations of the present application may be applied to various communication systems, such as a Global System of Mobile communication (GSM) system, a Code Division Multiple Access (CDMA) system, a Wideband Code Division Multiple Access (WCDMA) system, a General Packet Radio Service (CPRS), a Long Term Evolution (LTE) system, a LTE Frequency Division Duplex (FDD) system, LIE Time Division Duplex (TDD), a Universal Mobile Telecommunication System (UMTS), a Worldwide Interoperability for Microwave Access (WiMAX) communication system, or a 5G NR system, etc.

Figure 3:
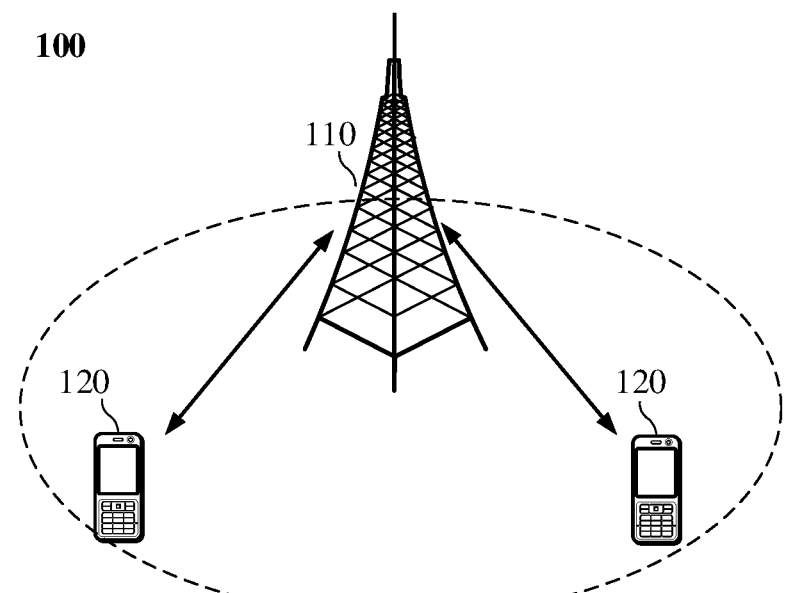
FIG. 3 is a schematic diagram of an architecture of a communication system according to an implementation of the present application.

Illustratively, a communication system 100 applied in an implementation of the present application is shown in FIG. 3. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in a LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The communication system 100 also includes at least one terminal device 120 located within the coverage area of the network device 110. As used herein, the term "terminal device" includes, but not limited to, a device configured to connect via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter;

and/or an apparatus, of another communication terminal, configured to receive/send a communication signal; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal capable of combining with a cellular wireless telephone and data processing, faxing, and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, a User Equipment (UE), a subscriber unit, a subscriber station, a mobile station, a rover station, a remote station, a remote terminal, a mobile device, a user terminal, a terminal, a wireless communication device, a user agent or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved Public Land Mobile Network (PLMIN), or the like.

Optionally, terminal direct connection (Device to Device, D2D) communication may be performed between the terminal devices 120.

Optionally, the 5G system or 5G network may be referred to as a New Radio (NR) system or a NR network.

FIG. 3 exemplifies one network device and two terminal devices. Optionally, the communication system 100 may include multiple network devices, and another quantity of terminal devices may be included within a coverage range of each network device, which is not limited by implementation of the present application.

Optionally, the communication system 100 may include other network entities such as a network controller, and a mobile management entity. Implementations of the present application are not limited thereto.

It should be understood that, a device with a communication function in a network/system in the implementation of the present application may be referred to as a communication device. Taking the communication system 100 shown in FIG. 3 as an example, the communication device may include a network device 110 and a terminal device 120 which have communication functions, and the network device 110 and the terminal device 120 may be the specific devices described above, which will not be repeated here. The communication device may also include another device in the communication system 100, such as another network entity such as a network controller, a mobile management entity, etc., which is not limited by the implementation of the present application.

It should be understood that the terms "system" and "network" are often used interchangeably in this document. The term "and/or" in this document is merely an association relationship describing associated objects, indicating that there may be three relationships, for example, A and/or 13 may indicate three cases: A alone, A and 13, and B alone. In addition, the symbol "/" in this document generally indicates that objects before and after the symbol "/" have an "or" relationship.

Figure 4:
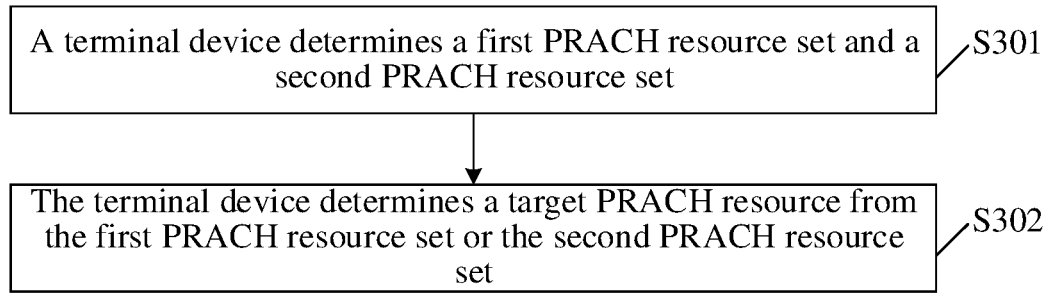
FIG. 4 is a schematic diagram of a random access method applied to a terminal device according to an implementation of the present application.

An implementation of the present disclosure provides an optional processing flow of a random access method applied to a terminal device, as shown in FIG. 4, including following acts S301-S302.

In S301, the terminal device determines a first PRACH resource set and a second PRACH resource set.

Here, the first PRACH resource set is used for PRACH sending in a first type of random access procedure, and the second type of PRACH resource set is used for PRACH sending in a second type of random access procedure. The first type of random access procedure corresponds to the random access method shown in FIG. 1 of the implementation of the present disclosure, information transmitted by a PRACH in the first type of random access procedure includes a preamble, the second type of random access procedure corresponds to the random access method shown in FIG. 2 of the implementation of the present disclosure, and information transmitted by a PRACH in the second type of random access procedure includes a preamble and uplink information.

It should be understood that in the implementation of the present application, the preamble is also referred to as a preamble sequence, and a preamble resource is also referred to as a preamble sequence resource or a sequence resource.

Optionally, in an implementation of the present application, the uplink information may include information for distinguishing the terminal device, such as a terminal device identity, RNTI, etc. Optionally, if the uplink information includes the RNTI, the RNTI may be selected by the terminal device from an RNTI set, preconfigured by the network device, for two-step RACH transmission.

Optionally, the uplink information may include information for distinguishing the terminal device and a category to which an event triggering Physical Random Access Channel (PRACH) sending belongs. Among them, the event triggering the PRACH sending may include following several kinds: the terminal device needs initial access; or when a wireless link fails, the terminal device needs to re-establish an RRC connection; or the terminal device is in an RRC connected state and needs to handover from a serving cell to a target cell; or the terminal device is in an RRC connected state, but uplink synchronization is not achieved, and the terminal device sends uplink data or receives downlink data at this time; or the terminal device hands over from an RRC inactive state to an PAC connected state; or the terminal device is in are RRC connected state, and a positioning process needs to be performed at this time, but the terminal device does not have TA; or the terminal device requests an Open System Interconnection reference model (OSI); or the terminal device needs to perform recovering of a Beam failure.

At this time, optionally, the terminal device may use a plurality of bits for indicating the category to which the event triggering PRACH sending belongs. For example, three bits may be used to indicate the category to which the event triggering PRACH sending belongs: "000" indicates that the terminal device needs to perform initial access, "001" indicates that the terminal device needs to reestablish an RRC connection, "010" indicates that the terminal device needs to perform cell handover, and "111" indicates that the terminal device needs to recover from a Beam failure.

Optionally, the uplink information may include information for distinguishing the terminal device, the category to which the event triggering PRACH sending belongs, and information that further needs to be delivered to complete this event.

Exemplarily, for initial access of the terminal device, three bits "000" may be used to indicate that the terminal device needs to perform the initial access, and in addition, another bit may also be used to indicate the information that further needs to be delivered to complete the initial access, such as an RRC connection request generated by an RRC layer.

Exemplarily, for connection re-establishment, three bits "001" may be used to indicate that the terminal device needs to re-establish an RRC connection, and in addition, another bit may also be used to indicate an RRC connection re-establishment request generated by the RRC layer.

Exemplarily, for cell handover of the terminal device, three bits "010" may be used to indicate that the terminal device needs to perform the cell handover, and in addition, another bit may also be used to indicate an RRC handover completion message generated by the RRC layer.

Further, the uplink information may also include, but is not limited to, a Scheduling Request (SR), a Buffer Status Report (BSR), and service data.

In an implementation of the present disclosure, a frequency domain starting position of any one of the first PRACH resources included in the first PRACH resource set is different from a frequency domain starting position of any one of the second PRACH resources included in the second PRACH resource set. And/or, any preamble included in the first PRACH resource set is different from any preamble included in the second PRACH resource set. And/or, at least one of first PRACH resources included in the first PRACH resource set is different from at least one of second PRACH resources included in the second PRACH resource set. Among them, at least one of the first PRACH resources included in the first PRACH resource set is different from at least one of the second PRACH resources included in the second PRACH resource set, including at least one of following cases: at least one of time domain starting positions of the first PRACH resources is different from at least one of time domain starting positions of the second PRACH resources, at least one of frequency domain starting positions of the first PRACH resources is different from at least one of frequency domain starting positions of the second PRACH resources, and at least one of the preambles included in the first PRACH resource set is different from at least one of the preambles included in the second PRACH resource set.

In an implementation of the present disclosure, an optional implementation for the terminal device to determine the first PRACH resource set and the second PRACH resource set is that the terminal device determines the first PRACH resource set according to a first PRACH configuration parameter configured by the network device, and determines the second PRACH resource set according to a second PRACH configuration parameter configured by the network device. Optionally, the first PRACH configuration parameter and the second PRACH configuration parameter are independently configured.

Optionally, the first PRACH configuration parameter and the second PRACH configuration parameter are random access parameters, including at least one of following: a PRACH configuration index, a PRACH frequency domain opportunity quantity, a PRACH time domain opportunity starting position, a PRACH frequency domain opportunity starting position and a sequence generation parameter.

Herein, the PRACH configuration index is used for determining a time domain resource and a repetition period of a PRACH; the PRACH frequency domain opportunity quantity is used for determining a frequency domain resource of the PRACH; and the sequence generation parameter is used for determining a sequence resource of the PRACH.

Figure 5:
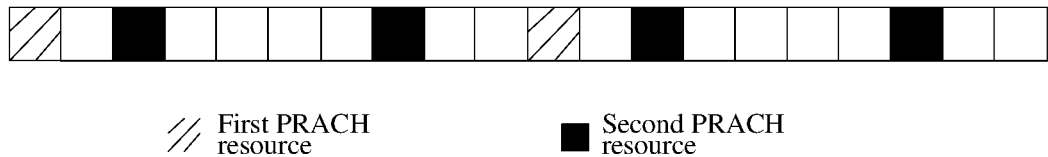
FIG. 5 is a schematic diagram of a first repetition period and a second repetition period of an implementation of the present application.

By way of example but not limitation, as shown in FIG. 5, the first PRACH resource corresponds to a first repetition period length, and the second PRACH resource corresponds to a second repetition period length, wherein the first repetition period length is 10 slots, the second repetition period length is 5 slots, and the second repetition period length is less than the first repetition period length. Or a repetition period length of the first PRACH resource is the same as that of the second PRACH resource; and within a period, a quantity of the first PRACH resource is less than that of the second PRACH resource. For example, as shown in FIG. 5 again, the repetition period length of the first PRACH resource is the same as that of the second PRACH resource, and both of them are 10 slots, and within a period, that is, 10 slots, the quantity of the first PRACH resource is 1, which is less than the quantity of the second PRACH resource by 2.

In some other implementations, a quantity of PRACH frequency domain opportunities is divided into two groups according to a quantity of terminal devices with a high priority service served by a cell, the first group of the quantity of frequency domain opportunities is used for the first type of random access procedure, and the second group of the quantity of frequency domain opportunities is used for the second type of random access procedure; and a frequency domain starting position of any first PRACH resource is different from a frequency domain starting position of any second PRACH resource. For example, a service or game and the like corresponding to a small cell, with shorter response time, belongs to a high-priority service, and a connection service of terminal devices served in a suburban district far away from network devices (such as base stations) belongs to a low-priority service. When there are many terminal devices with the high-priority service served by a cell, the second group of the quantity of frequency domain opportunities may be set to be greater than the first group of the quantity of frequency domain opportunities, and when there are many terminal devices with the low-priority service served by a cell, the first group of the quantity of frequency domain opportunities may be set to be greater than the second group of the quantity of frequency domain opportunities.

In yet some implementations, sequence resources are divided into two sequence resource groups, wherein one sequence resource group belongs to the first PRACH resource set and is used for the first type of random access procedure; and the other sequence resource group belongs to the second PRACH resource set and is used for the second type of random access procedure.

In yet some implementations, the second PRACH resource set includes at least two preamble sets and at least two time domain starting position sets of PRACH resources, and the at least two preamble sets and the at least two time domain starting position sets of the PRACH resources have a second association relationship. The first PRACH resource set includes at least two preamble sets and at least two time domain starting position sets of PRACH resources, and the at least two preamble sets and the at least two time domain starting position sets of the PRACH resources have a first association relationship. The first PRACH resource set includes a first preamble set, a second preamble set, a first time domain starting position set and a second time domain starting position set, and the second PRACH resource set includes a third preamble set, a fourth preamble set, the first time domain starting position set and the second time domain starting position set, wherein the first PRACH resource set includes PRACH resources jointly determined by the first time domain starting position set and the first preamble set, and PRACH resources jointly determined by the second time domain starting position set and the second preamble set; and/or, the second PRACH resource set includes PRACH resources jointly determined by the first time domain starting position set and the third preamble set, and PRACH resources jointly determined by the second time domain starting position set and the fourth preamble set; wherein a quantity of preambles included in the first preamble set is different from that included in the second preamble set, and a quantity of preambles included in the third preamble set is different from that included in the fourth preamble set.

In some implementations, the network device configures available sequence resources of a cell into a first sequence resource group and a second sequence resource group, for example, a sequence quantity of the first sequence resource group is greater than or equal to a sequence quantity of the second sequence resource group. Herein, the first sequence resource group is the preamble resource for the first type of random access procedure on the first PRACH time domain resource, and the second sequence resource group is the preamble resource for the second type of random access procedure on the first PRACH time domain resource. And/ or, the network device configures available sequence resources of a cell into a third sequence resource group and a fourth sequence resource group, for example, a sequence quantity of the third sequence resource group is less than a sequence quantity of the fourth sequence resource group. Herein, the third sequence resource group is the preamble resource for the first type of random access procedure on the second PRACH time domain resource, and the fourth sequence resource group is the preamble resource for the second type of random access procedure on the second PRACH time domain resource. Herein, the first PRACH time domain resource and the second PRACH time domain resource are PRACH transmission opportunities in time domain. Through the resource allocation mode, it may be caused that there is an available PRACH resource, on every PRACH time domain transmission opportunity for the first type of random access procedure and the second type of random access procedure, so that a time delay of the first type of random access procedure and the second type of random access procedure can be reduced to the greatest extent. In addition, through adjusting a quantity of preamble resources corresponding to the first type of random access procedure and the second type of random access procedure on a same PRACH time domain transmission opportunity, an indicator of PRACH resources needed in random access procedures triggered by different service priorities can also be met.

Figure 6:
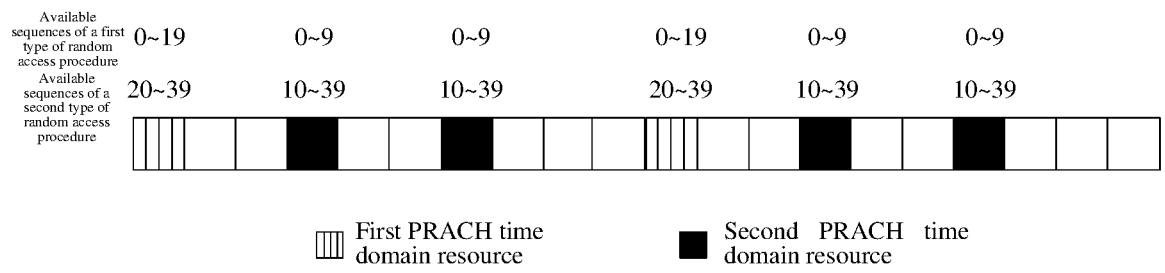
FIG. 6 is a schematic diagram of a first sequence group and a second sequence group of an implementation of the present application.

By way of example, but not limitation, taking FIG. 6 as an example, a quantity of sequences that may be used for the first type of random access procedure and the second type of random access procedure in a cell is 40, corresponding numbers are 0-39, the first sequence resource group includes sequences corresponding to numbers 0 to 19, the second sequence resource group includes sequences corresponding to numbers 20 to 39, the third sequence resource group includes sequences corresponding to numbers 0 to 9, and the fourth sequence resource group includes sequences corresponding to numbers 10 to 39. Herein, the sequences corresponding to the numbers 0 to 19 are preamble resources for the first type of random access procedure on the first PRACH time domain resource, the sequences corresponding to the numbers 20 to 39 are preamble resources for the second type of random access procedure on the first PRACH time domain resource, the sequences corresponding to the numbers 0 to 9 are preamble resources for the first type of random access procedure on the second PRACH time domain resource, and the sequences corresponding to the numbers 10 to 39 are preamble resources for the second type of random access procedure on the second PRACH time domain resource.

In act S302, the terminal device determines a target PRACH resource from the first PRACH resource set or the second PRACH resource set.

Here, the target PRACH resource is used for PRACH sending in a random access procedure.

In some implementations, the terminal device determines the target PRACH resource from the first PRACH resource set or the second PRACH resource set according to a priority of an event triggering the random access procedure. For example, the terminal device determines the target PRACH resource from the first PRACH resource set when the priority of the event triggering the random access procedure is low; and the terminal device determines the target PRACH resource from the second PRACH resource set when the priority of the event triggering the random access procedure is high.

Figure 7:
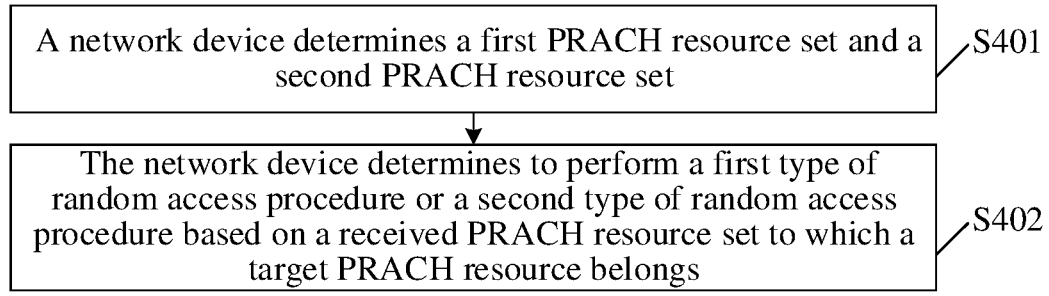
FIG. 7 is a schematic diagram of a random access method applied to a network device according to an implementation of the present application.

An implementation of the present disclosure provides an optional processing flow of a random access method applied to a network device, as shown in FIG. 7, including following acts S401-S402.

In act S401, the network device determines a first PRACH resource set and a second PRACH resource set.

In an implementation of the present disclosure, description for the first PRACH resource set, the second PRACH resource set, the first type of random access procedure and the second type of random access procedure refer to the description for the first PRACH resource set and the second PRACH resource set in the above act S301. In an implementation of the present disclosure, a processing procedure of determining the first PRACH resource set and the second PRACH resource set by the network device is similar to the above processing procedure of determining the first PRACH resource set and the second PRACH resource set by the terminal device, except that the executing subject is different, which will not be repeated here again.

In act S402, the network device determines to perform a first type of random access procedure or a second type of random access procedure based on a PRACH resource set to which a received target PRACH resource belongs.

In an implementation of the invention, the network device determines that a resource used for transmitting the PRACH belongs to the first PRACH resource set or the second PRACH resource set; the network device performs the first type of random access procedure when determining that the resource used for transmitting the PRACH belongs to the first PRACH resource set; and the network device performs the second type of random access procedure when determining that the resource used for transmitting the PRACH belongs to the second PRACH resource set.

Optionally, the network device performs the first type of random access procedure, including that the network device sends a random access response of the preamble to the terminal device. The network device performs the second type of random access procedure, including that the network device sends a random access response of the preamble and the uplink information to the terminal device.

Optionally, the network device performs the second type of random access procedure, including that the network device detects the preamble and does not detect the uplink information, and the network device sends a random access response of the preamble to the terminal device.

Based on the above implementation of the present disclosure, when both the first type of random access procedure and the second type of random access procedure can be achieved, after receiving a Preamble sent by the terminal device, the network device cannot determine that an operation corresponding to the first type of random access procedure needs to be performed or an operation corresponding to the second type of random access procedure needs to be performed. In the implementation of the invention, through dividing a PRACH resource set into a first PRACH resource set for PRACH sending in a first type of random access procedure and a second PRACH resource set for PRACH sending in a second type of random access procedure, it is caused that after receiving a Preamble, a network device can determine that a PRACH resource transmitting the Preamble belongs to the first PRACH resource set or the second PRACH resource set, and then determine the random access procedure to be the first type of random access procedure or the second type of random access procedure, and the network device can perform a corresponding operation (the act S102 or the act S202 in the above implementation) according to the determined type of random access procedure (the first type of random access procedure or the second type of random access procedure) to achieve fast random access.

Figure 8:
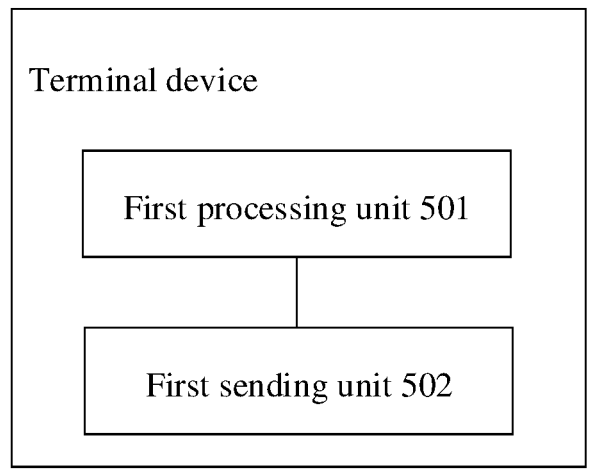
FIG. 8 is a schematic diagram of structure of a terminal device according to an implementation of the present application.

Based on the above random access method applied to the terminal device, an implementation of the present disclosure also provides a terminal device, and a composition structure of the terminal device, as shown in FIG. 8, includes: a first processing unit 501, configured to determine a first PRACH resource set and a second PRACH resource set, wherein the first PRACH resource set is used for PRACH sending in a first type of random access procedure, the second PRACH resource set is used for PRACH sending in a second type of random access procedure, and at least one of first PRACH resources included in the first PRACH resource set is different from at least one of second PRACH resources included in the second PRACH resource set; and a first sending unit 502, configured to determine a target PRACH resource from the first PRACH resource set or the second PRACH resource set, wherein the target PRACH resource is used for PRACH sending in a random access procedure.

In an implementation of the present disclosure, information transmitted by a PRACH in the first type of random access procedure includes a preamble, and information transmitted by a PRACH in the second type of random access procedure includes a preamble and uplink information.

In an implementation of the present disclosure, at least one of first PRACH resources included in the first PRACH resource set is different from at least one of second PRACH resources included in the second PRACH resource set, including at least one of following cases: at least one of time domain starting positions of the first PRACH resources is different from at least one of time domain starting positions of the second PRACH resources, at least one of frequency domain starting positions of the first PRACH resources is different from at least one of frequency domain starting positions of the second PRACH resources, and at least one of preambles included in the first PRACH resource set is different from at least one of preambles included in the second PRACH resource set.

In an implementation of the present disclosure, the first processing unit 501 is configured to determine the first PRACH resource set according to a first PRACH configuration parameter, and determine the second PRACH resource set according to a second PRACH configuration parameter.

In an implementation of the present disclosure, a repetition period length of the first PRACH resource is the same as that of the second PRACH resource; and within a period, a quantity of the first PRACH resource is less than that of the second PRACH resource. Or the first PRACH resource corresponds to a first repetition period length, and the second PRACH resource corresponds to a second repetition period length, wherein the second repetition period length is less than the first repetition period length.

In an implementation of the present disclosure, a frequency domain starting position of the first PRACH resource and a frequency domain starting position of the second PRACH resource are different.

In an implementation of the present disclosure, a preamble included in the first PRACH resource set is different from a preamble included in the second PRACH resource set.

In an implementation of the present disclosure, the second PRACH resource set includes at least two preamble sets and at least two time domain starting position sets of PRACH resources, and the at least two preamble sets and the at least two time domain starting position sets of the PRACH resources have a second association relationship. The first PRACH resource set includes at least two preamble sets and at least two time domain starting position sets of PRACH resources, and the at least two preamble sets and the at least two time domain starting position sets of the PRACH resources have a first association relationship.

In an implementation of the present disclosure, the first PRACH resource set includes a first preamble set, a second preamble set, a first time domain starting position set and a second time domain starting position set, and the second PRACH resource set includes a third preamble set, a fourth preamble set, the first time domain starting position set and the second time domain starting position set, wherein, the first PRACH resource set includes PRACH resources jointly determined by the first time domain starting position set and the first preamble set, and PRACH resources jointly determined by the second time domain starting position set and the second preamble set; and/or, the second PRACH resource set includes PRACH resources jointly determined by the first time domain starting position set and the third preamble set, and PRACH resources jointly determined by the second time domain starting position set and the fourth preamble set; wherein, a quantity of preambles included in the first preamble set is different from that included in the second preamble set, and a quantity of preambles included in the third preamble set is different from that included in the fourth preamble set.

In an implementation of the present disclosure, a sum of the quantity of preambles included in the first preamble set and the quantity of preambles included in the third preamble set is equal to a sum of the quantity of preambles included in the second preamble set and the quantity of preambles included in the fourth preamble set.

In an implementation of the present disclosure, the first sending unit 502 is configured to determine the target PRACH resource from the first PRACH resource set or the second PRACH resource set according to a priority of an event triggering a random access procedure.

In an implementation of the present disclosure, the first sending unit 502 is configured to determine the target PRACH resource from the first PRACH resource set when the priority of the event triggering the random access procedure is low; and determine the target PRACH resource from the second PRACH resource set when the priority of the event triggering the random access procedure is high.

Figure 9:
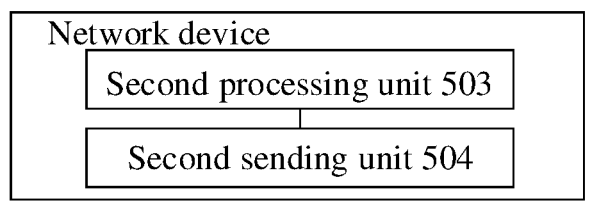
FIG. 9 is a schematic diagram of structure of a network device according to an implementation of the present application.

Based on the above random access method applied to the network device, an implementation of the present disclosure provides a network device, and a composition structure of the network device, as shown in FIG. 9, includes: a second processing unit 503, configured to determine a first PRACH resource set and a second PRACH resource set, wherein the first PRACH resource set is used for PRACH sending in a first type of random access procedure, the second PRACH resource set is used for PRACH sending in a second type of random access procedure, and at least one of first PRACH resources included in the first PRACH resource set is different from at least one of second PRACH resources included in the second PRACH resource set; and a second sending unit 504, configured to determine to perform a first type of random access procedure or a second type of random access procedure based on a PRACH resource set to which a received target PRACH resource belongs.

In an implementation of the present disclosure, description for the first PRACH resource set, the second PRACH resource set, the first type of random access procedure and the second type of random access procedure may all refer to the description for the first MACH resource set, the second PRACH resource set, the first type of random access procedure and the second type of random access procedure in the terminal device shown in FIG. 8, or the related description in the random access method applied to a network device shown in FIG. 7.

Figure 10:
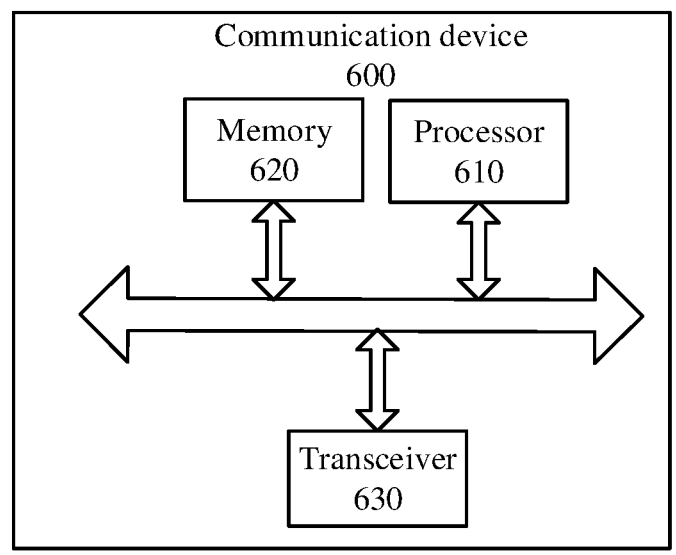
FIG. 10 is a schematic block diagram of a communication device according to an implementation of the present application.

FIG. 10 is a schematic structural diagram of a communication device 600 according to an implementation of the present application. The communication device 600 shown in FIG. 10 includes a processor 610. The processor 610 may call and run a computer program from a memory to implement the method in the implementation of the present application.

Optionally, as shown in FIG. 10, the communication device 600 may further include a memory 620. The processor 610 may call and run a computer program from the memory 620 to implement the method in the implementation of the present application. The memory 620 may be a separate device independent of the processor 610 or may be integrated in the processor 610.

Optionally, as shown in FIG. 10, the communication device 600 may further include a transceiver 630, and the processor 610 may control the transceiver 630 to communicate with another device, Specifically, information or data may be sent to another device, or information or data sent by another device is received. The transceiver 630 may include a transmitter and a receiver. The transceiver 630 may further include antennas, and the quantity of antennas may be one or more.

Optionally, the communication device 600 may specifically be a network device of the implementation of the present application, and the communication device 600 may implement corresponding processes implemented by the network device in various methods of the implementations of the present application, which will not be repeated here for brevity.

Optionally, the communication device 600 may be specifically a mobile terminal/terminal device of the implementation of the present application, and the communication device 600 may implement corresponding processes implemented by the mobile terminal/terminal device in various methods of the implementation of the present application, which will not be repeated here for brevity.

Figure 11:
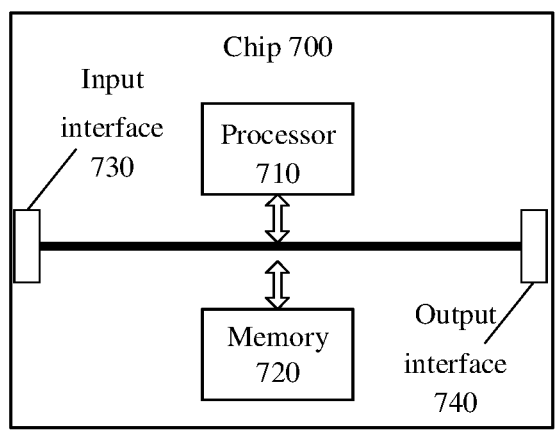
FIG. 11 is a schematic block diagram of a chip according to an implementation of the present application.

FIG. 11 is a schematic diagram of a structure of a chip of an implementation of the present application. A chip 700 shown in FIG. 11 includes a processor 710. The processor 710 may call and run a computer program from a memory to implement the method in the implementation of the present application.

Optionally, as shown in FIG. 11, the chip 700 may further include a memory 720. The processor 710 may call and run a computer program from the memory 720 to implement the method in the implementation of the present application.

The memory 720 may be a separate device independent of the processor 710 or may be integrated in the processor 710.

Optionally, the chip 700 may further include an input interface 730. The processor 710 may control the input interface 730 to communicate with other devices or chips. Specifically, the processor 710 may acquire information or data sent by other devices or chips.

Optionally, the chip 700 may further include an output interface 740. The processor 710 may control the output interface 740 to communicate with other devices or chips. Specifically, the processor 710 may output information or data to other devices or chips.

Optionally, the chip may be applied in a network device of the implementation of the present application, and the chip may implement the corresponding processes implemented by the network device in various methods of the implementation of the present application, which will not be repeated here for brevity.

Optionally, the chip may be applied in a mobile terminal/terminal device of the implementation of the present application, and the chip may implement the corresponding processes implemented by the mobile terminal/terminal device in the various methods of the implementation of the present application, which will not be repeated here for brevity.

It should be understood that the chip mentioned in the implementation of the present application may be referred to as a system-level chip, a system chip, a chip system or a system-on-chip, etc.

Figure 12:
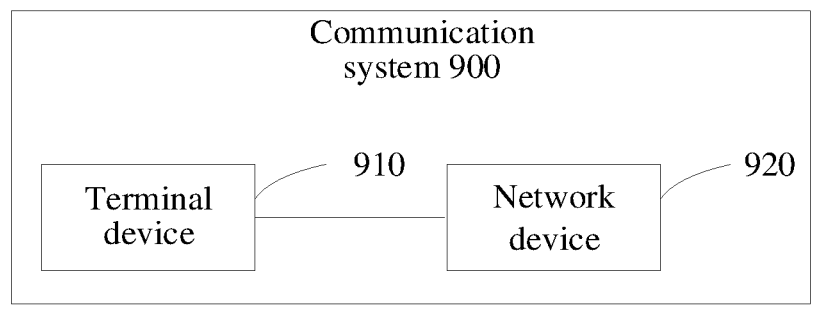
FIG. 12 is a schematic block diagram of a communication system according to an implementation of the present application.

FIG. 12 is a schematic block diagram of a communication system 900 according to an implementation of the present application. As shown in FIG. 12, the communication system 900 may include a terminal device 910 and a network device 920.

Herein, the terminal device 910 may be configured to implement the corresponding functions implemented by the terminal device in the above-mentioned method, and the network device 920 may be configured to implement the corresponding functions implemented by the network device in the above-mentioned method, which will not be repeated here for brevity.

It should be understood that, the processor in this implementation of the present application may be an integrated circuit chip having a signal processing capability. In an implementation process, the steps of the foregoing method implementations may be implemented by using an integrated logic circuit of hardware in the processor or instructions in a form of software. The processor may be a general purpose processor, a digital signal processor (Digital Signal Processing, DSP), an application specific integrated circuit (Application Specific Integrated Circuit, ASIC), a field programmable gate array (Field Programmable Gate Array, FPGA) or another programmable logic device, a discrete gate or a transistor logic device, or a discrete hardware component. The processor may implement or perform methods, acts and logical block diagrams disclosed in this implementation of the present application. The general purpose processor may be a microprocessor, or the processor may be any conventional processor or the like. The acts of the method disclosed with reference to this implementation of the present application may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

It may be understood that, the memory in this implementation of the present application may be a transitory memory or a non-transitory memory, or may include both a transitory memory and a non-transitory memory. The non-transitory memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The transitory memory may be a random access memory (Random Access Memory, RAM), and is used as an external cache. Through exemplary but not limitative description, many forms of RAMS may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR. SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memory in the systems and methods described in this specification is aimed at including but being not limited to these and any memory of another proper type.

It should be understood that, the foregoing memory is an example for illustration and should not be construed as limiting. For example, optionally, the memory in the implementations of the present application may be a Static RAM (SRAM), a Dynamic RAM (DRAM), a Synchronous DRAM (SDRAM), a Double Data Rate SDRAM (DDR. SDRAM), an Enhanced SDRAM (ESDRAM), a Synchlink DRAM (SLDRAM), a Direct Rambus RAM (DR RAM), or the like. That is, memories in the implementations of the present application are intended to include, but are not limited to, these and any other suitable types of memories.

An implementation of the present application further provides a computer readable storage medium configured to store a computer program.

Optionally, the computer readable storage medium may be applied in a network device of the implementation of the present application, and the computer program causes a computer to perform corresponding processes implemented by the network device in various methods of the implementations of the present application, which will not be repeated here for brevity.

Optionally, the computer readable storage medium may be applied in a terminal device of the implementation of the present application, and the computer program causes a computer to perform corresponding processes implemented by the terminal device in various methods of the implementations of the present application, which will not be repeated here for brevity.

An implementation of the present application also provides a computer program product including computer program instructions.

Optionally, the computer program product may be applied in a network device of the implementation of the present application, and the computer program instructions cause a computer to perform corresponding processes implemented by the network device in various methods of the implementations of the present application, which will not be repeated here for brevity.

Optionally, the computer program product may be applied in a mobile terminal/terminal device of the implementation of the present application, and the computer program instructions cause a computer to perform corresponding processes implemented by the terminal device in various methods according to the implementation of the present application, which will not be repeated here for brevity.

An implementation of the present application also provides a computer program.

Optionally, the computer program may be applied in a network device of the implementation of the present application. When the computer program is run on a computer, the computer is caused to perform corresponding processes implemented by the network device in various methods of the implementations of the present application, which will not be repeated here for brevity.

Optionally, the computer program may be applied in a terminal device of the implementation of the present application. When the computer program is run on a computer, the computer is caused to perform corresponding processes implemented by the terminal device in various methods of the implementations of the present application, which will not be repeated here for brevity.

Those of ordinary skill in the art will recognize that the exemplary elements and algorithm acts described in combination with the implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present application.

Those skilled in the art may clearly understand that for convenience and conciseness of description, the specific working processes of the systems, apparatuses and units described above may refer to the corresponding processes in the method implementations and will not be described here.

In several implementations provided by the present application, it should be understood that the disclosed system, apparatus and method may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present application may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present application, in essence, or the part contributing to the prior art, or the part of the technical solution, may be embodied in the form of a software product stored in a storage medium, including a quantity of instructions for causing a computer device (which may be a personal computer, a server, or a network device and the like) to perform all or part of the acts of the method described in various implementations of the present application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

What are described above are merely exemplary implementations of the present application, but the protection scope of the present application is not limited thereto. Any variation or substitution that may be easily conceived by a person skilled in the art within the technical scope disclosed by the present application shall be included within the protection scope of the present application. Therefore, the protection scope of the present application shall be determined by the protection scope of the claims.

What is claimed is:

1. A method for random access, comprising:
   determining, by a network device, a first Physical Random Access Channel (PRACH) resource set and a second PRACH resource set, wherein the first PRACH resource set is used for PRACH sending in a first type of random access procedure, the second PRACH resource set is used for PRACH sending in a second type of random access procedure, and at least one of first PRACH resources included in the first PRACH resource set is different from at least one of second PRACH resources included in the second PRACH resource set; and
   determining, by the network device, to perform the first type of random access procedure or the second type of random access procedure based on a PRACH resource set to which a received target PRACH resource belongs,
   wherein the first PRACH resource set comprises a first preamble set, a second preamble set, a first time domain starting position set, and a second time domain starting position set, and the second PRACH resource set comprises a third preamble set, a fourth preamble set, the first time domain starting position set, and the second time domain starting position set,
   wherein at least one of the following:
      the first PRACH resource set comprises PRACH resources jointly determined by the first time domain starting position set and the first preamble set, and PRACH resources jointly determined by the second time domain starting position set and the second preamble set, or
      the second PRACH resource set comprises PRACH resources jointly determined by the first time domain starting position set and the third preamble set, and PRACH resources jointly determined by the second time domain starting position set and the fourth preamble set, and
   wherein a quantity of preambles included in the first preamble set is different from that included in the second preamble set, and a quantity of preambles included in the third preamble set is different from that included in the fourth preamble set.

2. The method according to claim 1, wherein determining, by the network device, the first Physical Random Access Channel (PRACH) resource set and the second PRACH resource set, comprises:
   determining, by the network device, the first Physical Random Access Channel (PRACH) resource set and the second PRACH resource set according to a random access parameter;
   wherein the random access parameter comprises at least one of following:
   a PRACH configuration index, a PRACH frequency domain opportunity quantity, or a sequence generation parameter.

3. The method according to claim 1, wherein the at least one of the first PRACH resources is different from at least one of the second PRACH resources, comprising at least one of following cases:
   at least one of time domain starting positions of the first PRACH resources is different from at least one of time domain starting positions of the second PRACH resources;
   at least one of frequency domain starting positions of the first PRACH resources is different from at least one of frequency domain starting positions of the second PRACH resources; or
   at least one of preambles included in the first PRACH resource set is different from at least one preambles included in the second PRACH resource set.

4. The method according to claim 1, wherein determining, by the network device, the first PRACH resource set and the second PRACH resource set, comprises:
   respectively configuring, by the network device, a first random access parameter and a second random access parameter; and
   determining the first PRACH resource set according to the first random access parameter, and determining the second PRACH resource set according to the second random access parameter;
   wherein the first PRACH resource set comprises a first time domain resource, a first frequency domain resource and a first sequence resource;
   wherein the second PRACH resource set comprises a second time domain resource, a second frequency domain resource and a second sequence resource.

5. The method according to claim 4, further comprising:
   configuring, by the network device, a first PRACH configuring index corresponding to the first PRACH resource set and a second PRACH configuration index corresponding to the second PRACH resource set; and a second repetition period length corresponding to the second PRACH resource is less than a first repetition period length corresponding to the first PRACH resource.

6. The method according to claim 4, wherein respectively configuring, by the network device, the first random access parameter and the second random access parameter, comprises:

configuring, by the network device, a first PRACH configuration index corresponding to the first PRACH resource set and a second PRACH configuration index corresponding to the second PRACH resource set;

a repetition period length corresponding to the second PRACH resource is the same as a repetition period length corresponding to the first PRACH resource; and within a period, a quantity of the first PRACH resource is less than that of the second PRACH resource.

7. The method according to claim 4, wherein respectively configuring, by the network device, the first random access parameter and the second random access parameter, comprises:

configuring, by the network device, a first PRACH frequency domain opportunity quantity corresponding to the first PRACH resource set and a second PRACH frequency domain opportunity quantity corresponding to the second PRACH resource set, enabling a frequency domain starting position of the first PRACH resource to be different from that of the second PRACH resource.

8. The method according to claim 4, wherein respectively configuring, by the network device, the first random access parameter and the second random access parameter, comprises:

configuring, by the network device, an available sequence resource of a cell into a first preamble set and a second preamble set; and any preamble included in the first PRACH resource set is different from any preamble included in the second PRACH resource set.

9. The method according to claim 1, wherein the second PRACH resource set comprises at least two preamble sets and at least two time domain starting position sets of PRACH resources, and the at least two preamble sets and the at least two time domain starting position sets of the PRACH resources have a second association relationship.

10. The method according to claim 1, wherein the first PRACH resource set comprises at least two preamble sets and at least two time domain starting position sets of PRACH resources, and the at least two preamble sets and the at least two time domain starting position sets of the PRACH resources have a first association relationship.

11. The method according to claim 1, wherein a sum of the quantity of preambles included in the first preamble set and the quantity of preambles included in the third preamble set is equal to a sum of the quantity of preambles included in the second preamble set and the quantity of preambles included in the fourth preamble set.

12. The method according to claim 1, wherein determining, by the network device, to perform the first type of random access procedure or the second type of random access procedure based on a received PRACH, comprises:

determining, by the network device, that a resource used for transmitting the PRACH belongs to the first PRACH resource set or the second PRACH resource set;

performing, by the network device, the first type of random access procedure when determining that the resource used for transmitting the PRACH belong to the first PRACH resource set; and performing, by the network device, the second type of random access procedure when determining that the resource used for transmitting the PRACH belong to the second PRACH resource set.

13. A terminal device, comprising:

a processor, configured to determine a first Physical Random Access Channel (PRACH) resource set and a second PRACH resource set, wherein the first PRACH resource set is used for PRACH sending in a first type of random access procedure, the second PRACH resource set is used for PRACH sending in a second type of random access procedure, and at least one of first PRACH resources included in the first PRACH resource set is different from at least one of second PRACH resources included in the second PRACH resource set; and a transceiver, configured to determine a target PRACH resource from the first PRACH resource set or the second PRACH resource set, wherein the target PRACH resource is used for PRACH sending in a random access procedure, wherein the first PRACH resource set comprises a first preamble set, a second preamble set, a first time domain starting position set, and a second time domain starting position set, and the second PRACH resource set comprises a third preamble set, a fourth preamble set, the first time domain starting position set, and the second time domain starting position set, wherein at least one of the following:
the first PRACH resource set comprises PRACH resources jointly determined by the first time domain starting position set and the first preamble set, and PRACH resources jointly determined by the second time domain starting position set and the second preamble set, or the second PRACH resource set comprises PRACH resources jointly determined by the first time domain starting position set and the third preamble set, and PRACH resources jointly determined by the second time domain starting position set and the fourth preamble set, and wherein a quantity of preambles included in the first preamble set is different from that included in the second preamble set, and a quantity of preambles included in the third preamble set is different from that included in the fourth preamble set.

14. The terminal device according to claim 13, wherein information transmitted by a PRACH in the first type of random access procedure comprises a preamble, and information transmitted by a PRACH in the second type of random access procedure comprises a preamble and uplink information.

15. The terminal device according to claim 13, wherein the at least one of first PRACH resources included in the first PRACH resource set is different from at least one of second PRACH resources included in the second PRACH resource set, comprising at least one of following cases:

at least one of time domain starting positions of the first PRACH resources is different from at least one of time domain starting positions of the second PRACH resources;

at least one of frequency domain starting positions of the first PRACH resources is different from at least one of frequency domain starting positions of the second PRACH resources; or at least one of preambles included in the first PRACH resource set is different from at least one preambles included in the second PRACH resource set.

16. The terminal device according to claim 13, wherein the processor is configured to determine the first PRACH resource set according to a first PRACH configuration parameter, and determine the second PRACH resource set according to a second PRACH configuration parameter.

17. The terminal device according to claim 13, wherein a repetition period length of the first PRACH resource is the same as that of the second PRACH resource; and
within a period, a quantity of the first PRACH resource is less than that of the second PRACH resource.

18. The terminal device according to claim 13, wherein the first PRACH resource corresponds to a first repetition period length, and the second PRACH resource corresponds to a second repetition period length, wherein the second repetition period length is less than the first repetition period length.

19. The terminal device according to claim 13, wherein the transceiver is configured to determine the target PRACH resource from the first PRACH resource set or the second PRACH resource set according to a priority of an event triggering the random access procedure.

20. The terminal device according to claim 19, wherein the transceiver is configured to determine the target PRACH resource from the first PRACH resource set when the priority of the event triggering the random access procedure is low;
and determine the target PRACH resource from the second PRACH resource set when the priority of the event triggering the random access procedure is high.

* * * * *